No. 882,462. PATENTED MAR. 17, 1908.
G. W. GOLDSBORO.
MARKER ATTACHMENT FOR PLANTERS.
APPLICATION FILED SEPT. 3, 1907.
2 SHEETS—SHEET 1.
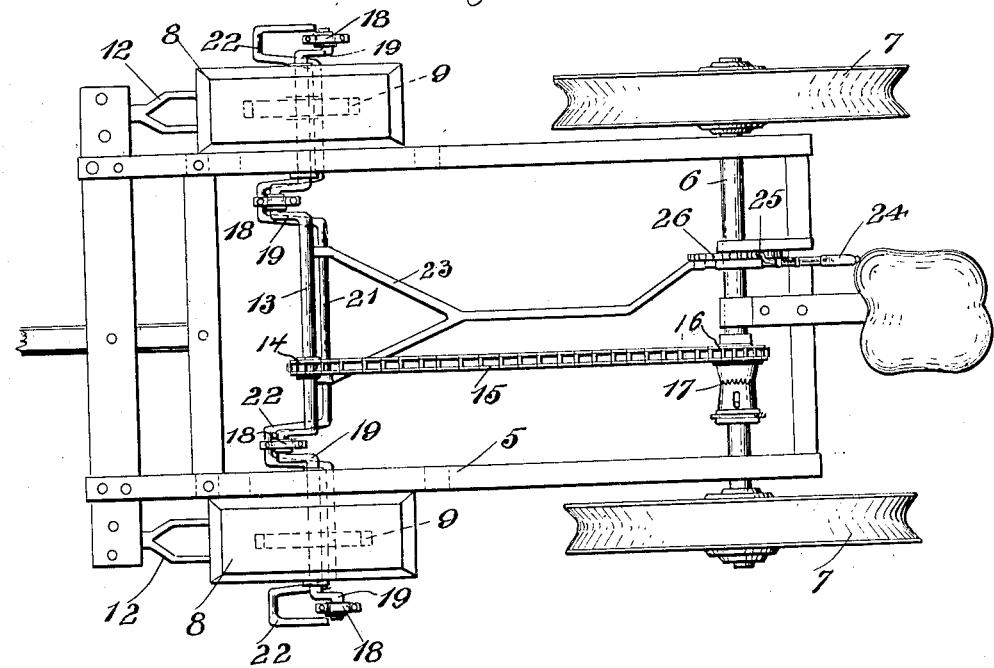
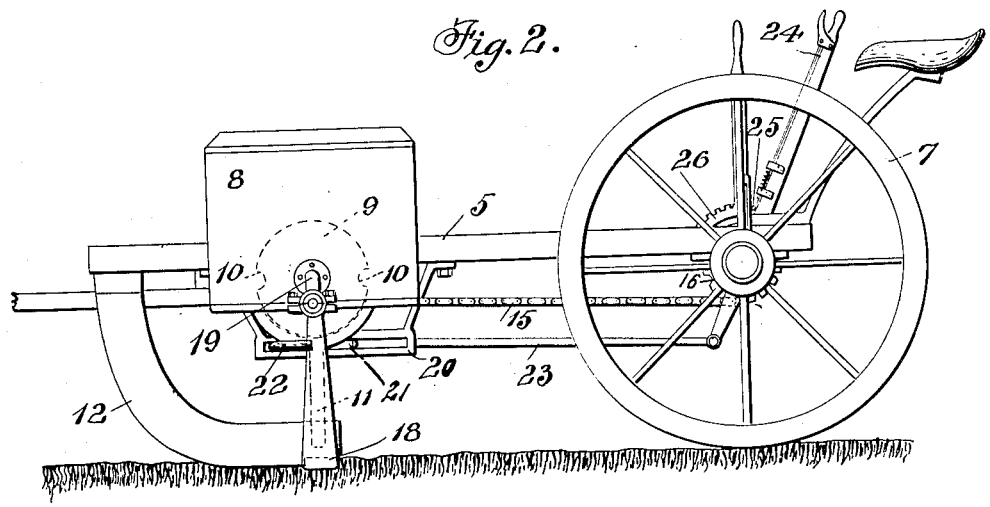

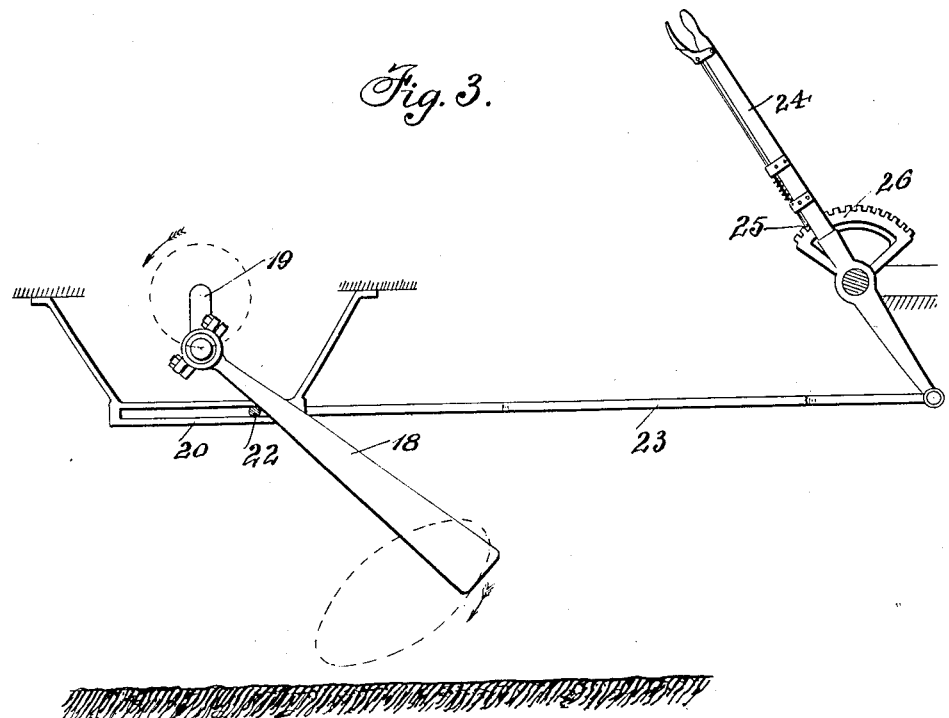
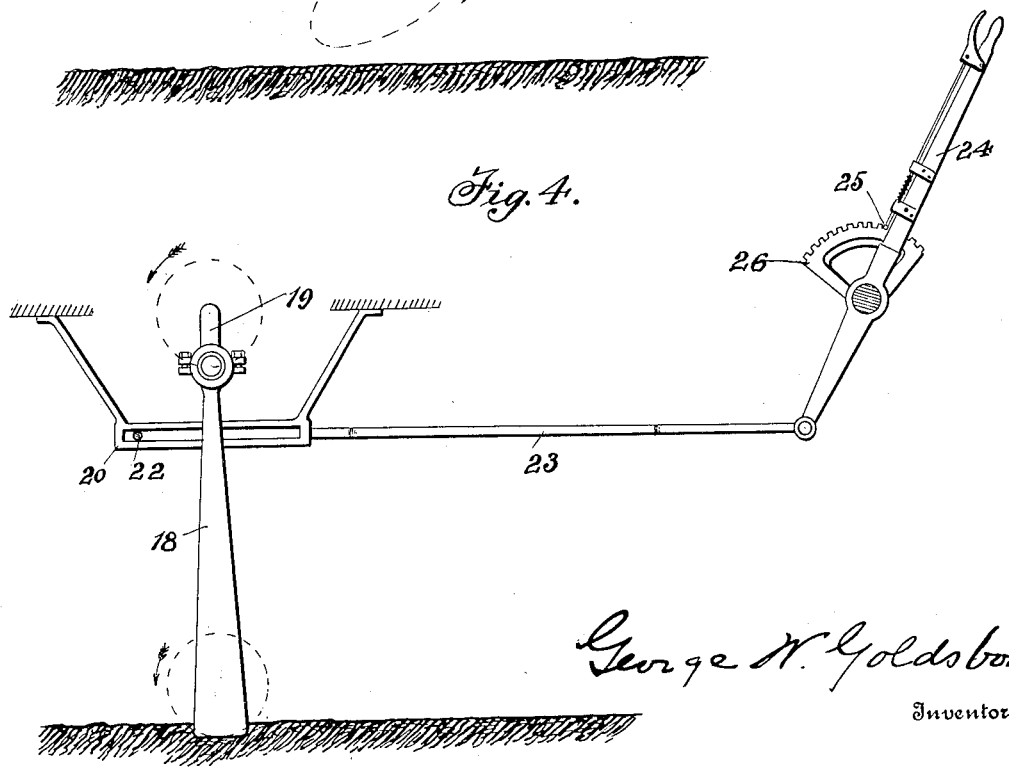

UNITED STATES PATENT OFFICE.

GEORGE W. GOLDSBORO, OF TULSA, OKLAHOMA.

MARKER ATTACHMENT FOR PLANTERS.

No. 882,462.

Specification of Letters Patent.

Patented March 17, 1908.

Application filed September 3, 1907. Serial No. 391,251.

*To all whom it may concern:*

Be it known that I, GEORGE W GOLDSBORO, a citizen of the United States, residing at Tulsa, Oklahoma, have invented certain new and useful Improvements in Marker Attachments for Planters, of which the following is a specification.

This invention relates to corn-planters, and has for its object to provide an improved device for marking the ground as a guide for the next bout.

In the accompanying drawing Figure 1 is a plan view of a planter provided with the marking device. Fig. 2 is a side elevation. Figs. 3 and 4 are diagrammatic representations showing the operation of the marking device and the means for throwing the same out of action.

In the drawings 5 denotes the frame of the machine; 6, the axle; and 7, the wheels. The seed-boxes 8 are mounted at the front end of the machine in any suitable manner, and each contains a seed-dropping mechanism comprising a rotatable disk 9 having in its periphery pockets 10 which receive the seed and carry it to the seed-tubes 11 arranged under the disks. The usual furrow openers 12 are also provided. The disks are made fast on a transverse drive-shaft 13 mounted in suitable bearings on the frame 5. The shaft is driven by a sprocket wheel 14 thereon which is connected by means of a chain 15 with a sprocket wheel 16 on the axle 6. The axle is provided with a suitable clutch-mechanism 17 for throwing the seed-dropping disks into or out of action.

The markers are elongated blades 18 which are loosely hung on cranks 19 of the shaft 13. Preferably, two markers are employed for each seed-box, they being arranged on opposite sides thereof. The cranks of each pair of markers are set at 180 degrees so that when one marker is entering the ground, the other will be in elevated position. The markers normally hang erect on the cranks, they being made heaviest at their lower ends for this purpose.

As it is necessary to employ the markers only at the beginning of a row, means are provided for throwing them out of action. Such means are as follows: On the bottom of the side-beams of the frame are secured brackets 20 in which is mounted to slide lengthwise therein a bar 21 having offsets 22 which coincide with the cranks 19. The bar 21 is connected by links 23 to a hand-lever 24 fulcrumed on the frame and provided with a locking device 25 engageable with a segment rack 26. The bar 21 is so located that the offsets 22 can be placed into and out of the path of the markers. With the offsets in the first mentioned position the markers will be held inoperative, and in the latter position they will be left free to enter the ground and mark the same. The operation will be understood by reference to Fig. 3 in which the offsets 22 are shown in the path of the markers. With the parts in this position, the markers when they descend, and before reaching the ground, come against the offsets sidewise whereby they will be tilted upwardly so that they will not touch the ground. The offsets are so positioned that the markers slide over the same back and forth as the crank rotates and they remain in engagement with the offsets until the latter are withdrawn. To throw the markers into action, the bar 21 is pushed forwardly by means of the hand-lever 24 until the markers clear the offsets as shown in Fig. 4, whereupon they are free to enter the ground and mark it when the crank is at the lowest point of its travel.

The marking device herein described is simple in construction and reliable in operation. It makes two marks thereby enabling more accurate planting to be done. After the marks are made at the beginning of the row the markers will be thrown out of action in the manner herein described.

I claim:

1. A marker-attachment for planters comprising a wheel-driven crank-shaft, a marker loosely hung on the crank, and means for tilting the marker to prevent its contact with the ground.

2. A marker attachment for planters comprising a wheel-driven crank-shaft, a normally erect marker loosely hung on the crank, and a bar slidable into the path of the marker for holding it out of contact with the ground.

3. A marker attachment for planters comprising a wheel-driven crank-shaft, and markers loosely hung on the cranks, said cranks being set so that the markers will operate alternately.

In testimony whereof I affix my signature, in presence of two witnesses.

GEORGE W. GOLDSBORO.

Witnesses:
C. M. WINTERINGEN,
GEO. B. STANLEY.